May 29, 1923.
A. E. OSBORN
PISTON
Filed June 29, 1920
1,456,708
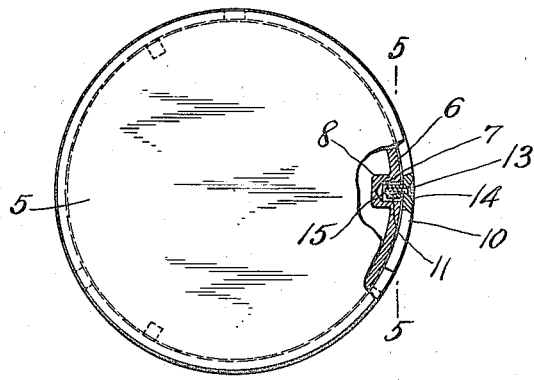
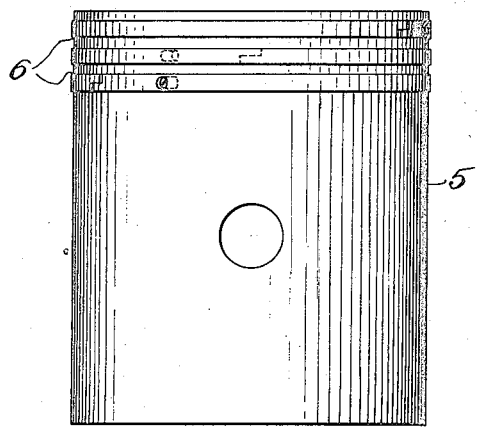
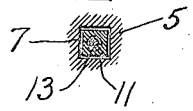
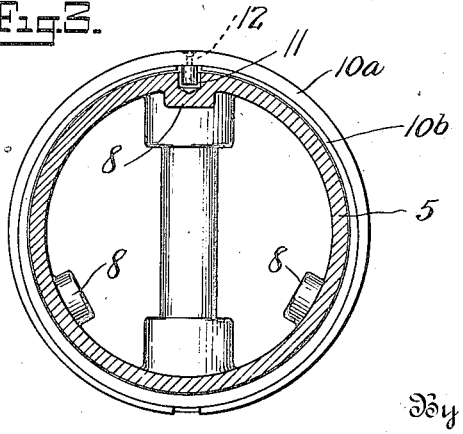
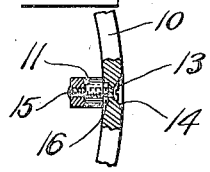
Inventor
A. E. Osborn
By his Attorney
E. W. Marshall Patented May 29, 1923.

1,456,708

UNITED STATES PATENT OFFICE.

ALDEN E. OSBORN, OF NEW YORK, N. Y.

PISTON.

Application filed June 29, 1920. Serial No. 392,694.

*To all whom it may concern:*

Be it known that I, ALDEN E. OSBORN, a citizen of the United States, and a resident of the city of New York, county and State of New York, have invented certain new and useful Improvements in Pistons, of which the following is a specification.

This invention relates particularly to pistons and piston rings such as are employed in internal combustion engines.

In pistons where a number of rings are employed it is important that the rings be so located that the joints therein shall not stand in alinement, this to prevent leakage of gas. It is also important in some engines that the rings be held against rotation to prevent the end thereof from catching in openings or ports in the cylinder walls.

Various means have been proposed for securing the rings against rotation such as by providing pins on the piston engaging in seats in the rings. This, while perhaps a preferred method up to the present time, is open to certain objections particularly in that it involves driving pins into the piston which are liable to become loose, due to the action of heat, expansion and other causes, and also in that when the piston is removed from the cylinder, the rings may expand far enough to release themselves from the pins and catch in such a way as to break off the pins or the rings when the piston is put back in the cylinder.

My invention aims to overcome these and other difficulties which have been experienced in the past and to provide simple and at the same time effective means for securing the piston rings against rotative movement about the piston.

In my invention the rings are provided with positioning pins rigidly and permanently secured thereto and working in seats or sockets provided in the wall of the piston.

The invention involves certain novel features of construction, combinations and relation of parts as will be disclosed in the course of the following specification.

In the drawing accompanying and forming a part of this specification, I have illustrated the invention embodied in a practical and commercial form, but wish it understood that modifications may be made without departure from the true spirit and scope of the invention as herein defined and claimed.

In the drawing referred to:

Figure 1 is a plan and part sectional view of a piston constructed in accordance with and embodying the features of the invention.

Figure 2 is a side elevation of the same.

Figure 3 is a sectional view illustrating the invention as applied to a multi-part form of ring.

Figure 4 is an enlarged detail view illustrating a method of securing the pin to the ring.

Figure 5 is a broken sectional view of a modified form of pin as seated in the piston.

The piston which is designated 5 is of the usual construction in that it is cut with a series of grooves 6 for the rings but differs from the ordinary piston in that it is provided at the back or bottom of these grooves with seats or sockets 7. To provide sufficient metal for these sockets the piston may be formed with bosses or lugs 8 on the inner wall thereof as indicated in Figs. 1 and 3.

In Figs. 1 and 2, I have shown the rings 10 as seated in the grooves provided therefor, and as disposed with the joints offset in the approved fashion to prevent leakage and loss of pressure. The rings are held in this relation by pins 11 projecting from the inner face of the rings into the sockets 7 above referred to.

These pins may be secured to the rings in various ways. For instance, they may be riveted thereto as indicated at 12 (Fig. 3) or they each may be secured thereto by means of a stud in the form of a screw 13 whose head is seated in a depression 14 in the outer face of the ring and whose inner portion is screwed into the body of the pin and then headed over at the inner end as indicated at 15.

These positioning pins are preferably secured to the rings near the ends thereof, as in Fig. 2, so as not to weaken the body of the ring or interfere in any way with its free expansion. The location of the positioning pins near the ends of the rings is also an aid in assembling the rings on the piston since naturally the end of the ring can be more easily sprung open for the purpose of engaging the pins in the sockets provided therefor.

With my invention it is simply necessary after the ring grooves are turned in the piston to drill the sockets for the positioning pins. These pins may be secured to the rings before they are sprung in their seats but they need not be secured until after the rings are seated. For instance, in the structure shown in Fig. 4, the outward end of the pin body 11 is square or made angular in shape as indicated at 16 to seat in a corresponding socket in the inner face of a ring. With this construction it is possible first to locate the pins in the sockets of the piston and then to slip the rings in position thereover and finally to screw the securing screws or studs from the outside into engagement with the previously positioned pins. The studs may then be suitably locked as by peening the metal of the ring over the heads at the outer ends of the studs, or by soft solder or other suitable means.

The positioning pins have a loose fit in their sockets as illustrated, so as not to interfere with the free expansion of the rings and they serve simply to hold the rings in their pre-arranged relation on the piston. The pins also are made long enough so as to still hold in their sockets even after the piston is removed from the cylinder.

The invention, it will be seen, provides a simple and at the same time a very practical method of securing the rings, and one which is quite inexpensive.

In Fig. 3 I have shown how the invention may be applied to a two-part ring. Here the positioning pin 11 is secured to the outer ring part 10ª and projects into the socket in the piston inwardly between the spaced ends of the inner part 10ᵇ so as to hold both pieces against rotation.

The positioning pins may be made angular in cross section and the seats provided therefor in the piston be correspondingly shaped substantially as I have indicated in Figures 4 and 5, where the pin 11 is made substantially square in cross section and the socket 7 is of the same shape. This construction makes it very easy to secure the pin to the ring in the order above set forth, that is, by first locating the pin in its socket and then slipping the piston ring into position thereover and inserting the securing screw from the outside of the ring into the positioning pin, the square socket holding the square pin against rotation during this securing operation. This construction and method of assembling eliminates any undue stretching of the ring and at the same time permits use of a pin having a relatively long bearing in the piston.

What I claim is:

1. The combination with a piston provided with a groove and with a socket in the back wall of said groove, of a packing ring seated in said groove, and an inwardly projecting positioning pin secured to and carried by said ring and loosely fitting in the socket aforesaid, said pin comprising a bushing having an angular outer end engaging a corresponding seat in the ring and a stud for securing the bushing when thus seated to the ring.

2. A piston ring and a positioning pin carried thereby and comprising an internally threaded bushing and a screw extended through from the outer face of the ring into said screw-threaded bushing.

3. A piston ring and a positioning pin carried thereby and comprising an internally threaded bushing and a screw extended through from the outer face of the ring into said screw-threaded bushing, said bushing being of angular cross section.

4. A piston ring and a positioning pin carried thereby and comprising an internally threaded bushing and a screw extended through from the outer face of the ring into said screw-threaded bushing, said bushing having an angular outer end and the inner face of the piston ring having a correspondingly angular seat to receive the same.

5. A piston ring, a positioning pin carried thereby, said pin being of tubular construction and a securing stud extending through said tubular pin and piston ring.

6. The combination with a piston provided with a groove and with a socket in the back wall of said groove, of a packing ring in said groove, and an inwardly projecting positioning pin loosely fitting in said socket and secured to said ring by means passing through said ring and drawing said pin against the inner surface of the ring.

7. The combination with a piston provided with a groove and with a socket in the back wall of said groove, of a packing ring in said groove, and an inwardly projecting positioning pin loosely fitting in said socket and means for securing said pin to said ring after said ring is placed within the said piston groove.

8. The combination with a piston provided with a groove and with a socket in the back wall of said groove, a positioning pin loosely fitting in said socket but being restrained from rotation therein, a packing ring in said groove and around said pin and means actuated from the outside of said ring for securing said positioning pin to its inner surface.

9. A piston ring, a positioning pin carried thereby and a stud extending through the piston ring and into the pin.

10. The combination with a piston provided with a groove and with a socket in the back wall of said groove, of a packing ring in said groove, and an inwardly projecting positioning pin loosely fitting in said socket and means for securing said pin to said ring from the outside of said ring.

11. A piston ring, a positioning pin carried thereby and means operable from the outside of the ring for securing the pin to said ring.

In witness whereof, I hereunto set my hand this 23rd day of June, 1920.

ALDEN E. OSBORN.